June 18, 1968 K. C. ALLEN ET AL 3,388,758

AUTOMATIC WEIGHING SCALES WITH RECORDING AND TOTALING APPARATUS

Filed Sept. 26, 1966 7 Sheets-Sheet 1

INVENTORS

KENNETH C. ALLEN &
EDWIN E. BOSHINSKI

BY Marechal, Biebel, French & Bugg
ATTORNEYS

June 18, 1968 K. C. ALLEN ET AL 3,388,758

AUTOMATIC WEIGHING SCALES WITH RECORDING AND TOTALING APPARATUS

Filed Sept. 26, 1966 7 Sheets-Sheet 7

United States Patent Office 3,388,758

Patented June 18, 1968

3,388,758

AUTOMATIC WEIGHING SCALES WITH RECORDING AND TOTALING APPARATUS

Kenneth C. Allen and Edwin E. Boshinski, Dayton, Ohio, assignors to The Hobart Manufacturing Company, Troy, Ohio, a corporation of Ohio Filed Sept. 26, 1966, Ser. No. 582,101
17 Claims. (Cl. 177—4)

ABSTRACT OF THE DISCLOSURE

A scale for weighing, a computer for reading out the weight of each weighed load and computing the value thereof at a preset unit price, a register-printer for printing and issuing a label containing information concerning the weight, unit price and value, and an adding machine for totalling information such as weight and/or value of any desired number of loads.

This invention relates to computing and printing scale systems, and it will be described with particular relation to the system shown in our copending application Ser. No. 422,730, filed Dec. 31, 1964, hereinafter referred to as Case A.

The system shown in Case A includes as its basic components, a scale for weighing successive loads, a computer for reading out the weight of each weighed load and computing the value thereof at a preset unit price, and a register-printer for printing and issuing a label containing information concerning the relative load, such particularly as its weight, unit price and value. The system of Case A is particularly characterized by a solid state computing system which includes a pulse generator and a plurality of pulse counters, and all operations of read out, storage, computing and recording are effected by appropriate control of the transmission of pulses throughout the system.

The present invention provides a supplement for a system of the type disclosed in Case A, comprising an adding machine for totaling information such as the weight and/or value of any desired number of weighed loads, and controls for coupling such adding machine with the automatic scale system in simple and effective manner while offering maximum assurance against error. The invention is therefore in some respects similar in its general nature to the combination of an adding machine with an automatic weighing system disclosed in Allen Patent 3,170,624 issued Feb. 23, 1965 to the assignee of the present case.

The present invention may be generally described as comprising primarily the combination of an adding machine with an automatic scale system which embodies counters or other storage units for temporarily storing the information to be recorded for each weighed load, and a scanning mechanism for reading out the temporarily stored information and transferring it to the register-printer. Specific characteristics of the invention reside in the novel controls which cooperate with the temporary storage units and scanning mechanism to receive the same information being transmitted between the computer and the register-printer and use this information to initiate and control the operation of the adding machine without affecting the normal operation of the balance of the system. The invention employs pulse counters which are driven by the scanner mechanism of the register-printer in such manner as to read out the desired information from the storage units of the computer and deliver that information to the adding machine, and additional characteristics of the invention include the provision of interlocks which function in combination with the computer and register-printer to assure that the proper operation of each component of the entire system has occurred for each load before the cycle can begin for the next load.

Additional characteristics, objects and advantages of the invention will be apparent or pointed out in the course of the following description, the accompanying drawings and the appended claims.

In the drawings—

FIG. 3 shows fragments of the computer circuits and register-printer circuits and mechanisms;

Figure 4:
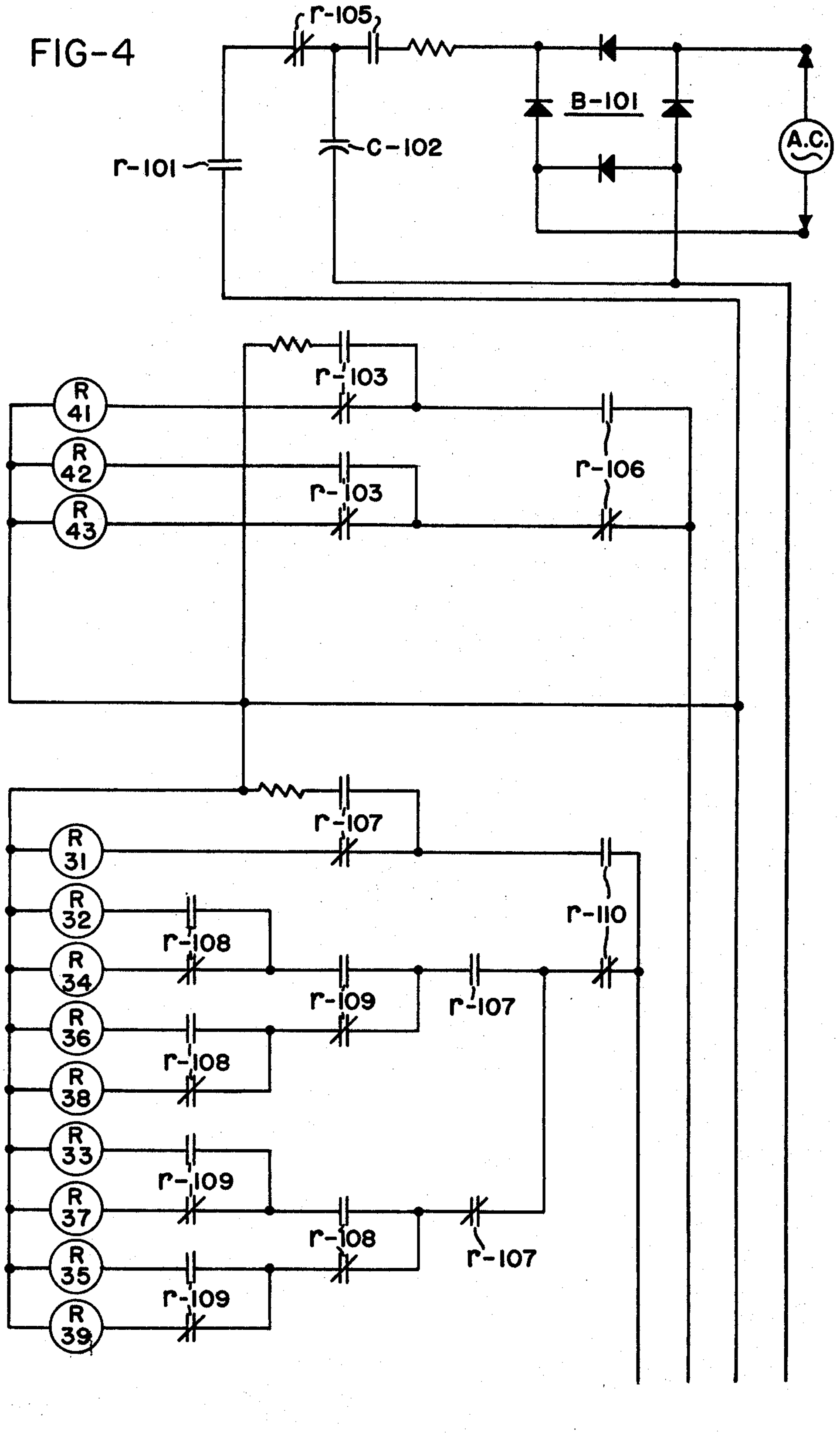
Figures 5, 6:
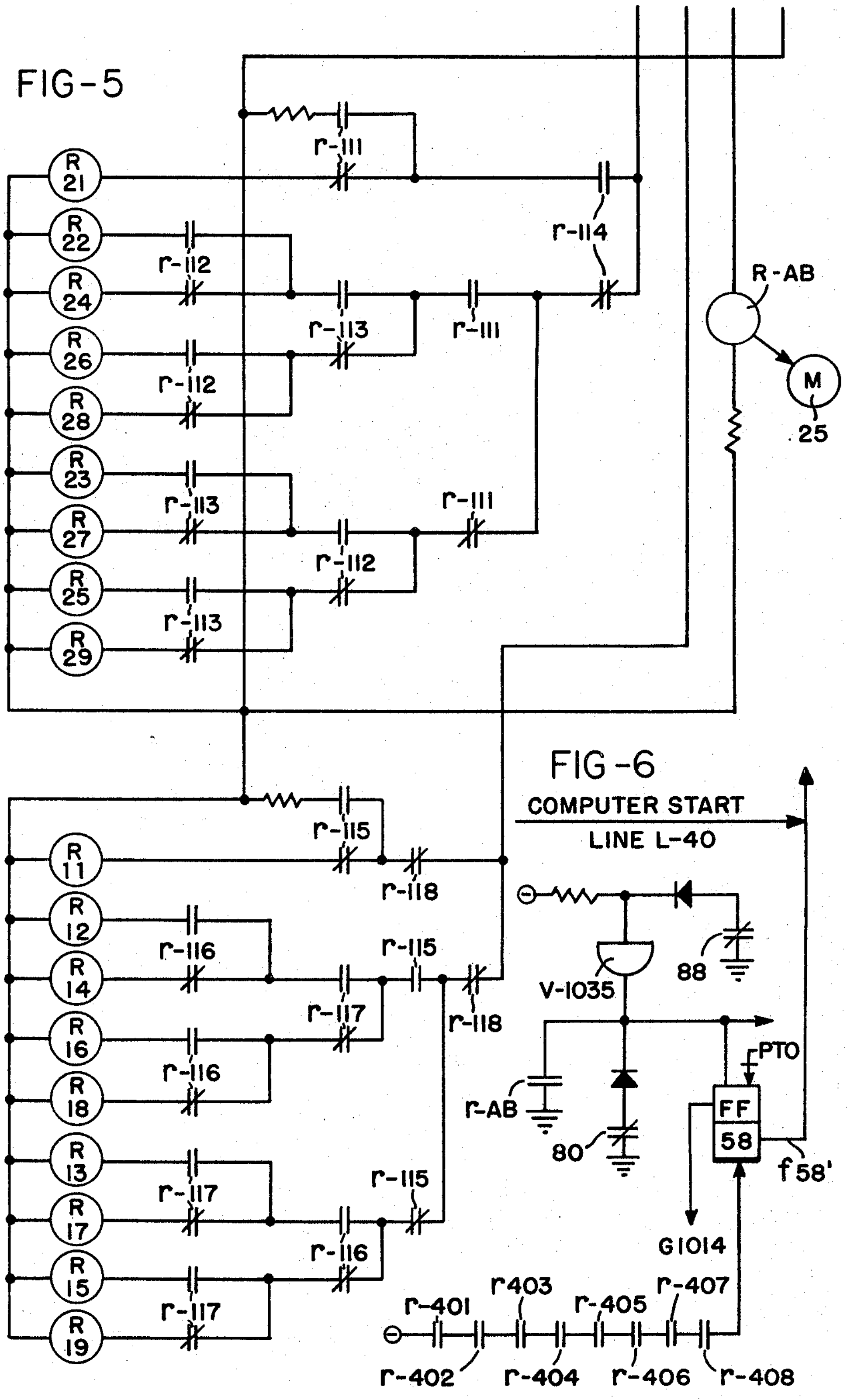
Figure 7:
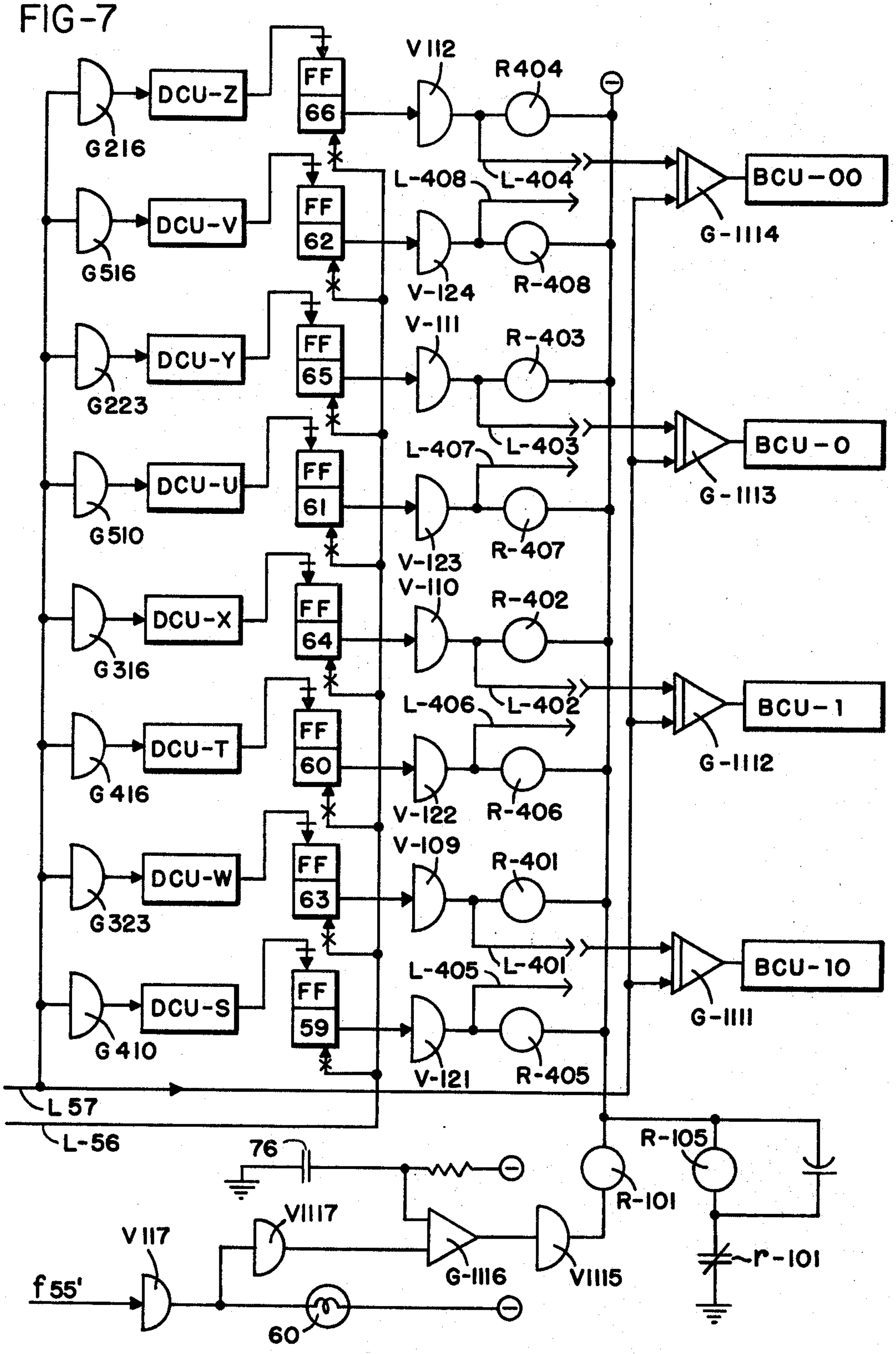
Figure 8:
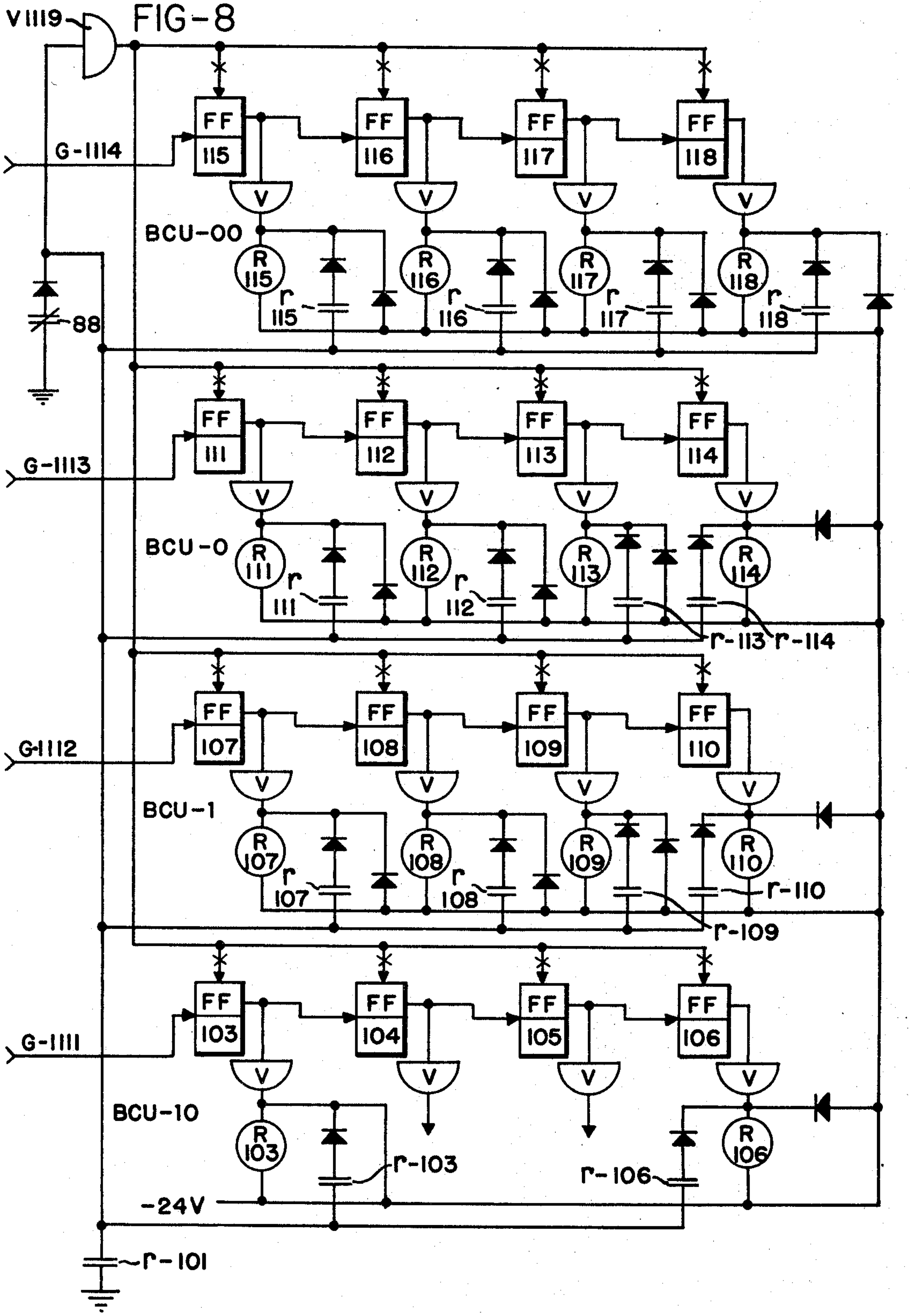
Figure 9:
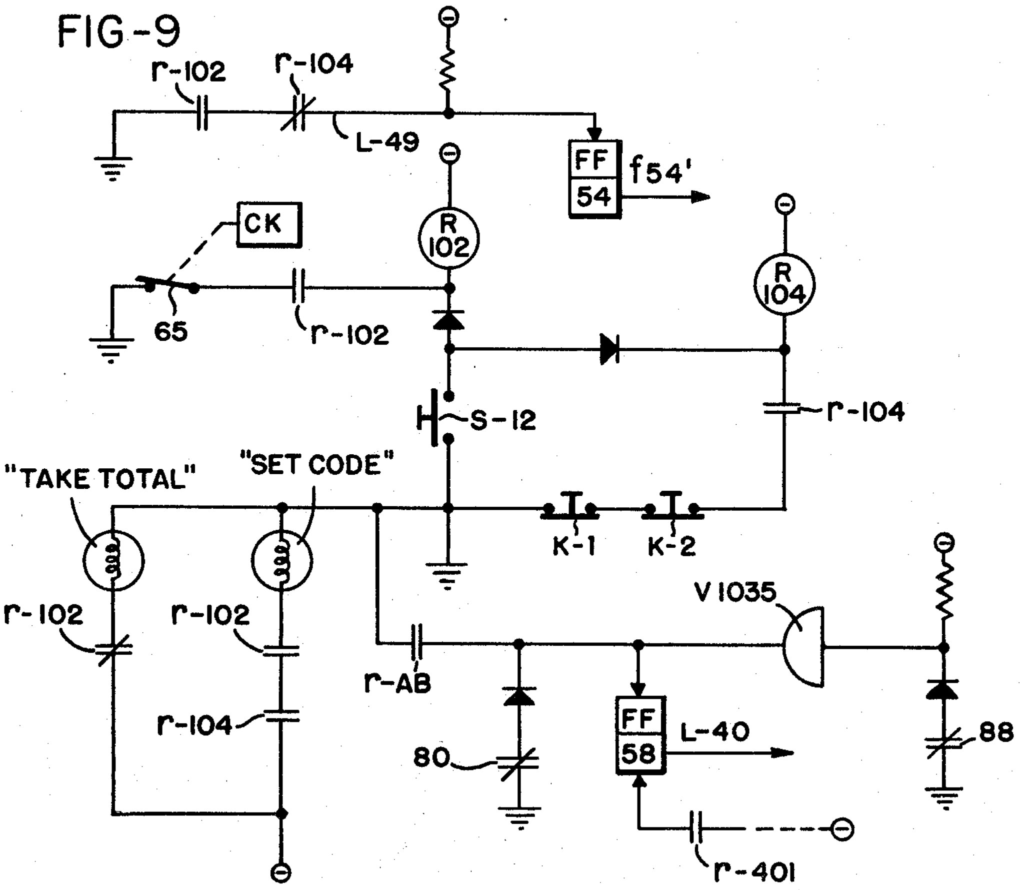
Figure 10:
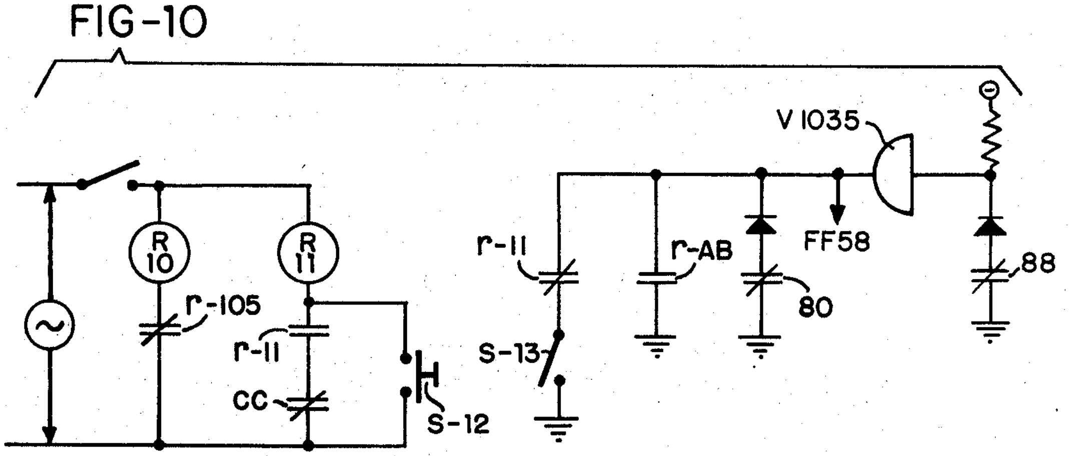
Figure 11:
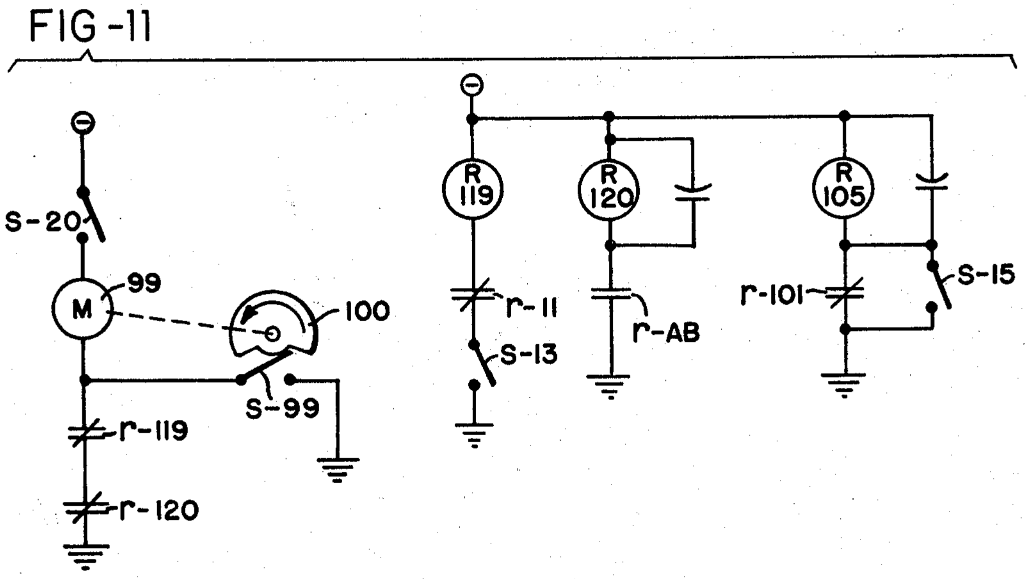
Figure 12:
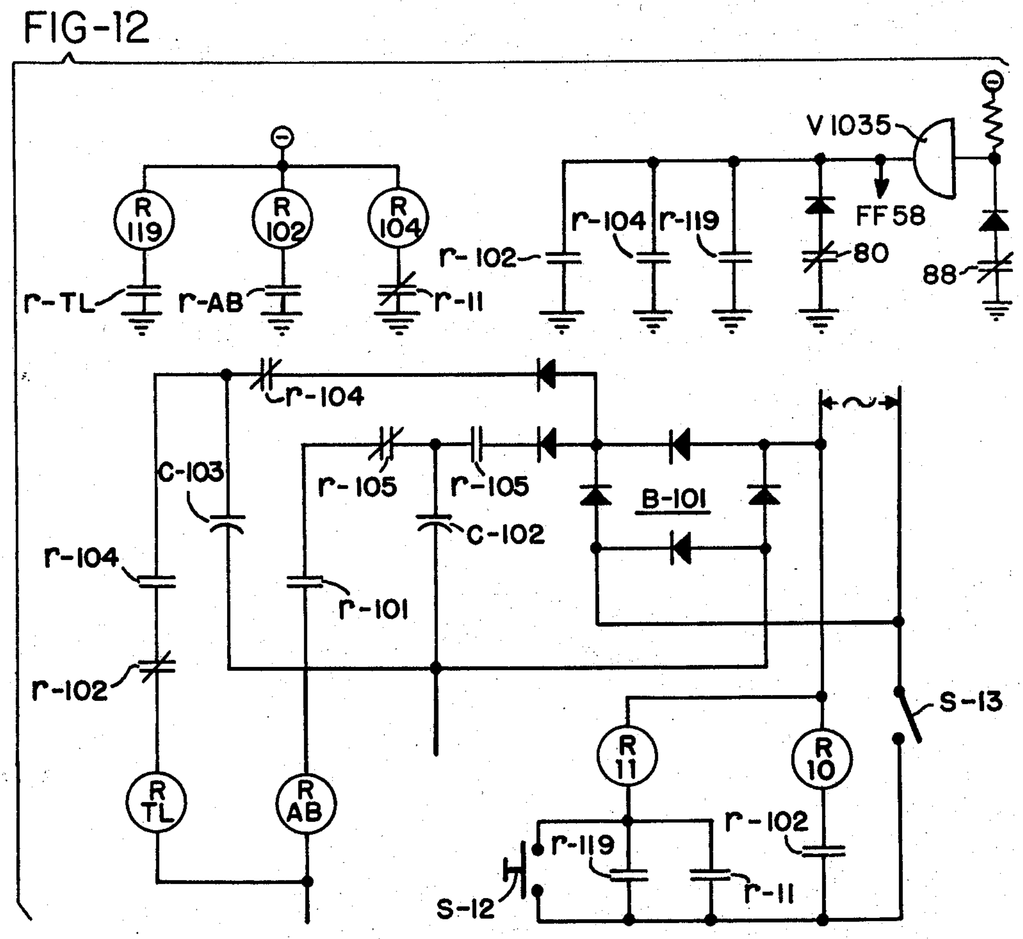

FIGS. 4 and 5 together show primarily the key selecting circuits for the system;

FIG. 6 shows the interlock circuits for assuring proper operation of the adding machine;

FIG. 7 illustrates the connections between the adding machine controls and the computer and register-printer circuits;

FIG. 8 shows details of the adding machine controls;

FIG. 9 shows modifications of the circuitry of FIGS. 3–7 for requiring that the operator take a total of the information recorded on the adding machine each time a change is made in the commodity being weighed;

FIG. 10 shows other modifications of the circuitry of FIGS. 3–7 for the purpose of controlling the adding machine by means of a counter;

FIG. 11 shows further modifications of the circuitry of FIGS. 3–7 and 10 arranged to require that a total be taken after the system has completed a predetermined number cycles; and FIG. 12 shows further modifications of the circuitry arranged to take a total after a predetermined number of cycles of the system and automatically to reset the system for a further number of cycles.

Figures 1, 2, 3:
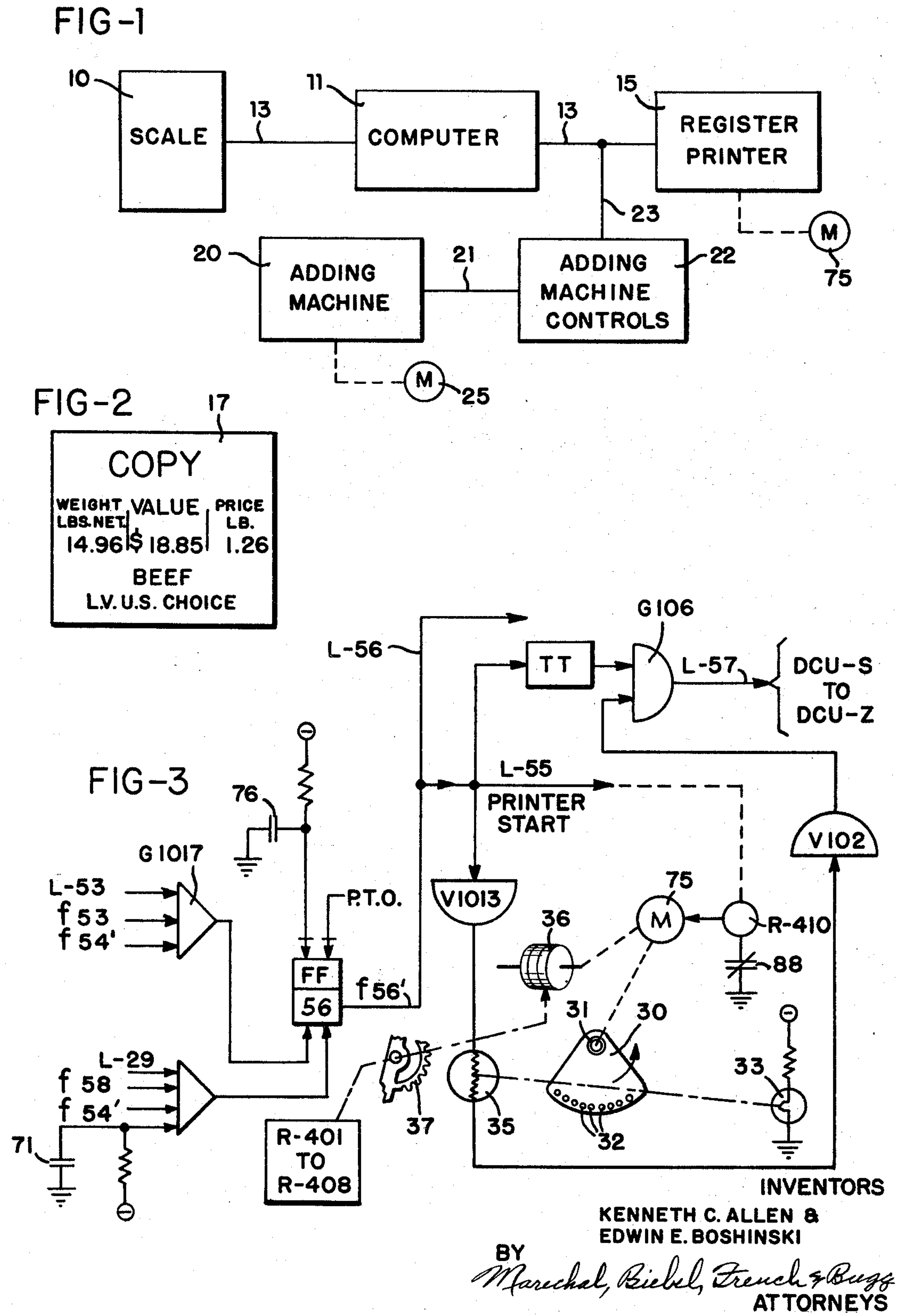
FIG. 1 is a block diagram of a complete system in accordance with the invention.
FIG. 2 illustrates a printed label of the type issued by the register-printer in the system of FIG. 1.
FIGS. 3–7 are respectively fragments of a logic diagram which illustrate in combination the controls of the invention and their cooperation with the balance of the system shown in Case A, as follows.

Referring to the drawings, which illustrate a preferred embodiment of the invention, the basic relationships of a system incorporating the invention are represented diagrammatically in FIG. 1, wherein the scale 10 and computer 11 are interconnected by a cable 12. The computer is in turn interconnected by a cable 13 with the register-printer 15, and FIG. 2 shows a printed label 17 of the type issued by the register-printer 15. The present invention supplements this basic system in FIG. 1 with an adding machine 20 interconnected by a cable 21 with its control box 22, and the latter is in turn interconnected by a cable 23 with the cable 13 between the computer 11 and register-printer 15.

The logic diagram composed of FIGS. 3–8 incorporates fragments of the logic diagram of Case A and employs the same symbols, and all parts in FIGS. 3–8 which correspond to similar parts in Case A have been given the same reference characters, except that the prefix (*r*) is used in conjunction with all relay contacts. In addition, the scanner mechanism and circuitry illustrated diagrammatically in FIG. 3 are of the construction and mode of operation disclosed and claimed in our copending application Ser. No. 550,293, filed May 16, 1966, hereinafter referred to as Case B.

The register-printer 15 is shown fragmentarily in FIG. 3 as of essentially the same mechanical construction disclosed in Allen Patent No. 2,948,465. For present purposes, it is necessary only to identify the fan-shaped scanner 30, which is the same part as the scanner 20 in Case B and corresponds in function to the scanner 300 in Patent 2,948,465 and the scanner 77 in Case A. The scanner 30 is mounted on the printer shaft 31 and is provided near its periphery with a row of nine small holes 32 arranged in an arc centered on the shaft 31.

During its operating cycle, the scanner 30 moves forward and back through an arc such that the holes 32 register successively with the light beam from a lamp 33 to a photocell 35 for the purpose of illuminating this photocell through each of the successive holes 32.

The register-printer 15 includes register members represented by the type wheels 36, and as indicated by dotted lines in FIG. 3, all of the mechanical parts of the rigister-printer 15 including the scanner shaft 31 and the type wheels 36 are driven by a motor 75 having the same reference character in Case A. The solenoids R–401 to R–408 represent the series of similarly numbered key solenoids in Case A which correspond to the solenoids 285 in Patent 2,948,465 and operate during the cycle of printer-motor 75 to effect setting of the type wheels 36 through an intermediate system of sectors as represented at 37 in FIG. 3, and as described in detail in Patent 2,-948,465. The switch 71 is the same repeat switch 71 shown in Case A, and the switch 76 is the same cam operated switch shown in Case A. The solenoid R–410 in FIG. 3 corresponds to solenoid 410 in Case A which operates the starting switch for the printer motor 75, as shown diagrammatically in FIG. 3.

The adding machine 20 is indicated as of conventional construction. It is driven by an operating motor 25 (FIG. 5) and is controlled by a series of key solenoids R–11 to R–19, R–21 to R–29, R–31 to R–39, and R–41 to R–43 in FIGS. 4 and 5 which depress the typical keys of the adding machine. The add bar solenoid R-AB initiates the operating cycle of the adding machine by depressing the usual add bar and thereby starting motor 25 as indicated diagrammatically in FIG. 5.

As described in detail in Case A, the cycle of complete system for each load begins when a motion detector in the scale gives a signal of no motion indicating that the scale has come to balance. All subsequent stages of the cycle are controlled by a program counter which normally rests in home position during weighing. After the balance signal is received, the program counter moves through the successive stages of its cycle, during which the balance position of the scale is read out photoelectrically, the weight digits are temporarily stored in digital counting units DCU-W to DCU-Z, the value is computed, and the value digits are temporarily stored in the digital counting units DCU-S to DCU-V. The present invention is concerned only with the final stages of the cycle, when the digital information of weight and value is transferred to the register members of the register-printer for recording, and particularly with transfer of some or all of the same information to the key solenoids of the adding machine 20, by means of the controls now described in connection with FIGS. 7 and 8.

The specific form of the invention shown in the drawings is designed to transmit to the adding machine either the weight or the value information for each weighing operation, but it merely requires duplication of components and a larger capacity or second adding machine to handle both weight and value. The principal components of the adding machine controls are four binary pulse counting units, each of which receives and transmits information as to the appropriate digit for one decade column of weight or value. These counting units are accordingly designated as BCU–00, BCU–0, BCU–1 and BCU–10 for the hundredths, tenths, ones and tens columns respectively.

These counting units are of essentially the same individual construction as the storage counters DCU-S to DCU-Z except that they do not incorporate feed-back circuits because it is not necessary that they be decimal counting units. As shown in FIG. 8, each of these counters comprises four flip-flops connected in series, such as flip-flops FF–115 to FF–118 in counter BCU–00, and each flip-flop also has its output connected through an inverter V and the energizing coil of an associated relay, such as relay R–115 for flip-flop FF–115, to a source of negative voltage at 24 volts. Counter BCU–10 differs from the other three in that the outputs of its flip-flops FF–104 and FF–105 are unconnected, because the associated adding machine is shown as capable only of printing the digits 1, 2 and 3 in the tens column, as shown by the presence of only three key solenoids R–41 to R–43 in FIG. 4.

The remaining components of the adding machine control circuits are more rapidly described in conjunction with the operation of these circuits, which occurs simultaneously with a portion of the complete cycle of the associated system, and specifically in synchronism with the recording portion thereof. For the purposes of the present description, it is important only to note that initiation of the cycle of the computer requires, among other conditions, a negative signal on line L–40 from output *f58'* of flip-flop FF–58 shown in FIG. 6. The initial stages of the computer cycle result in temporary storage of the digits of weight and value in storage counters DCU-S to DCU-Z, as already noted. Then during the recording portion of the cycle, this information is transferred to the register-printer and printed, and the circuits of the invention operate during this same portion of the cycle to transfer some or all of the same information to the adding machine 20 as now described.

The start of the recording portion of the cycle is controlled by plus NAND gate G1017 shown in FIG. 3. When this stage of the cycle is ready to begin, the inputs *f53* and *f54'* to gate G1017 are both positive so long as errors have not occurred, as described in Case A, and the recording cycle is initiated by a positive signal from the program counter line L–53. With all inputs positive to gate G1017, the resulting negative signal to flip-flop FF–56 causes its output *f56'* to emit a positive signal which will accomplish four results.

The first result will be a positive signal on line L–55 which, as indicated by dotted lines, will result in energizing solenoid R–410 and causing it to close the starting circuit for the printer motor 75. As described in Patent 2,948,465, motor 75 will then run for its complete cycle but will at the start of this cycle mechanically open the switch 88 through which solenoid R–410 was energized, and then reclose switch 88 at the end of its cycle.

The second result of the positive signal from output *f56'* is that it removes the negative voltage on line L–56 which had been holding flip-flop FF–59 to FF–66 with negative outputs to their associated key solenoids.

The third result of the positive signal from output *f56'* is to provide negative voltage through inverter V1013 to photocell 35. In its home position, which corresponds to the digit "9," however, scanner 30 cuts off the light path to photocell 35 from lamp 33 so that the photocell remains non-conducting.

The fourth result of the positive signal from output *f56'* is to cause a positive signal to be applied through the associated time trigger in FIG. 3 to plus NOR gate G106. The resulting negative signal on line L–57 is transmitted to each of the storage counters DCU-S to DCU-Z through the minus NOR gate which immediately precedes each counter, such as gate G410 for counter DCU-S in FIG. 7. This pulse causes each of the storage counters to advance one count from the state to which it had previously been set during the storage operations.

As described in Case A, when any of the storage counters advances to "0," it issues a carry pulse in the same manner as when it is counting in the normal manner. Thus with the weight and value information shown on label 17 in FIG. 2, counter DCU-Y would have been set to "9," the initial signal on line L–57 would advance it to "0," and the resulting carry pulse would result in a positive signal which would complete an energizing circuit for the solenoid R–403, which is the solenoid controlling the setting of the type wheel 36 in the printer for printing tenths of a pound.

During the first part of the cycle of the printer motor 75, the scanner 30 rotates through an arc sufficient to move each of the holes 32 through the light beam from lamp 33 to photocell 35, namely an arc of about 90°. As each hole 32 registers with the light beam, photocell 35 will become active, and the resulting negative signal will be changed to positive by inverter V102 and delivered to gate G106. This will in turn produce an additional negative pulse on line L–57 corresponding to the passage of each hole 32 through the light beam, and corresponding to the successive digits from "8" to "0." All storage counters will therefore again move through a single count for each pulse on line L–57, and when each one of the storage counters reaches its "0" position, it will cause energizing of the associated one of key solenoids R–401 to R–408 in the manner described, as will happen for counters DCU-T and DCU-U and solenoids R–406 and R–407 in the example of FIG. 2 in the "8" position of the scanner, and so forth.

As described in Patent 2,948,465, the key solenoids latch to their associated sectors 37 during the forward movement of the scanner 30, and the type wheels 36 in the printer which correspond to the respective storage counters are set during the return movement of the scanner to its home position. After all holes 32 have moved between the lamp 33 and photocell 35 and before the scanner reverses its direction of movement to return to its home position, the cam-operated switch 76 closes and does not reopen until near the end of the printer-register cycle. This grounds the negative voltage to flip-flop FF–56 and thereby restores it to its original condition and changes its output *f56′* to negative. Since the output of inverter V1013 is now positive, photocell 35 cannot generate a negative signal to inverter V102 even when it is illuminated periodically during the return movement of scanner 30. Also, the resulting negative signal on line L–56 resets flip-flops associated with the storage counters as described in Case A and thereby deenergizes all of the associated solenoids R–401–R–408 in order to be clear of the sectors 37 when they mechanically position the type wheels 36 as described in Patent 2,948,465.

The remainder of the cycle of the printer-register continues in substantially the manner described in Case A and in Patents 2,948,465 and 2,948,466. This includes ejection of the printed ticket or label and the setting up of an interlock which prevents the start of a new computer cycle until the label has been removed in the normally intended manner, as now described.

The label removal interlock is set up when all of the key solenoids have energized and thus closed their contacts *r*–401 to *r*–408 in the input line to flip-flop FF–58 as shown in FIG. 6. The resulting negative input produces a positive signal on output *f58′* to line L–40, and since this signal must be negative for a new cycle of the computer to start, as noted above, the computer is blocked from re-cycling. When switch 88 recloses at the end of the printer motor cycle, this grounds the negative input to inverter V1035, but the resulting negative output of inverter V1035 will then be grounded through normally closed mechanical switch 89, which corresponds to the switch 89 in Patent 2,948,466 and as described in that patent, is opened momentarily and then reclosed as an incident to the withdrawal of the label. When switch 89 opens, the resulting negative signal from inverter V1035 is applied to flip-flop FF–58, changing its output *f58′* to negative and thus making possible the start of a subsequent cycle of the computer for the next load to be weighed.

The adding machine controls operate during the cycle of the scanner 30 as just described to receive information which is being transmitted on cable 13 and supply that information to the adding machine. FIG. 7 shows the circuits as connected to supply only weight information to the adding machine, in that the lines L–405 to L–408 are unconnected, whereas lines L–401 to L–404 are each connected with an input to the associated one of minus NAND gates G–1111 to G–1114. These connections can be exchanged in order to supply value information to the adding machine instead of weight information, or larger capacity adding machines and sets of additional counting units can be used to total value as well as weight.

Immediately prior to the start of the register-printer cycle, all of the four binary counting units are held in their "9" positions, by the negative inputs to the top of each of their flip-flops which originate from the ground connection through switch 88 through inverter V–1119 (FIG. 8). This negative voltage is removed at the start of the register-printer cycle when switch 88 is opened as described above. Thus the binary counting units are prepared for counting action simultaneously with the start of the cycle of the register-printer.

As shown in FIG. 7, the same line L–57 which delivers pulses to counters DCU-S to DCU-Z also provides one input to each of gates G1111 to G1114. The other input to each of these gates comes from the energizing connection to the associated key solenoid from its associated storage counter and flip-flop, and as already noted, prior to the start of the recording cycle, all of these connections are negative. As long as this condition continues, therefore, each pulse on line L–57 results in a positive output from each of gates G1111 to G1114, which in turn causes the associated counting unit to count each of these pulses successively until its counting action is stopped as now described.

In the specific example illustrated by label 17 in FIG. 2, as already noted, the key solenoid R–403 will be energized in response to the initial pulse on line L–57, because a positive signal will immediately be transmitted to solenoid R–403 from storage counter DCU-Y through flip-flop output *f65′* and inverter V–111. This same positive signal will be applied to gate G1113, and thus no positive signals will be transmitted to counting unit BCU–0, and all of its relays R–111 to R–114 will remain unenergized throughout the scanner cycle.

Since none of the other weight storage counters were set to the digit "9," their associated binary counting units will follow the count of scanner pulses through the first three scanner positions, and their associated relays may close and open correspondingly. Thus the first pulse to relay BCU–00 will produce a negative signal on output *f115* which will be changed to positive by its inverter V and thus cause relay R–115 to energize. The second pulse delivered to this counting unit will result in a positive signal on output *f115* and therefore a negative signal on output *f116*, thus releasing relay R–115 and causing relay R–116 to energize, and the third pulse will result in energizing of relay R–115 while relay R–116 remains energized.

The fourth pulse from the scanner issued in its "6" position, will produce a carry pulse from storage counter DCU-Z to flip-flop FF–66, because of the digit "6" in the hundredths of a pound column. The resulting positive signal from inverter V112 to solenoid R–404 will cause it to energize, and this positive signal will also turn off gate G114. Counting unit BCU–00 will accordingly be stopped in its "6" position, with relays R–115 and R–116 being energized. The remaining counting units will continue to count the scanner pulses until in the "4" position of the scanner, solenoid R–402 will close and gate G1112 will be turned off, leaving relays R–107 and R–109 energized and relays R–108 and R–110 released. Similarly in the "1" position of the scanner, solenoid R–401 will energize and gate G1111 will be turned off, leaving relay R–103 released and relay R–106 closed.

When the cam-operated switch 76 closes at the midpoint of the scanner cycles as noted, it supplies one positive input to plus NAND gate G–1116 (FIG. 7). The other input to this gate originates from output *f55′* of flip-flop FF–55, which is the error detecting flip-flop, and whenever an error occurs, output *f55′* will be negative and will be changed to positive by inverter V117 and will thereby light the error light 60. If there was no error, however, output *f55'* is positive, and supplies a second positive input to gate G1116 by way of inverters V117 and V1117. The resulting negative signal from gate G1116 is changed to positive by inverter V1115 to complete an energizing circuit for relay R–101.

Closing of relay R–101 accomplishes four significant results. The first is to complete a locking path through its front contacts in FIG. 8 for those relays which have been energized by the binary counting units, thereby making those relays independent of their associated flip-flops. The same ground connection is inverted through inverter V1119 to a supply negative voltage to all of the flip-flops in the binary counting units which will simultaneously re-set and disable them from further counting action until the next cycle. The third result of the closing of relay R–101 is to prepare the power line to the key solenoids of the adding machine, through its front contacts which appear in the upper left hand corner of FIG. 4. Finally, closing of relay R–101 opens its back contacts in the energizing circuit for the power relay R–105 and this relay opens after a time delay provided by its associated condenser.

The power for the adding machine key solenoids originates from the A.C. source in the upper right hand corner of FIG. 4 and is changed to D.C. by the rectifier bridge B–101. While relay R–105 is energized, its back contacts disconnect the power source from the adding machine key solenoids at its back contacts at the top of FIG. 4, and at the same time its adjacent front contacts complete a charging circuit for the condenser C–102. When relay R–105 deenergizes after the time delay noted above, the condenser C–102 is disconnected from the rectifier and connected with the series of adding machine key solenoids, through the front contacts of relay R–101. Energizing circuits for the appropriate key solenoids have already been set up by the binary counting units as described, and for the particular example of FIG. 2, it will be seen that these circuits are such as to result in energizing of key solenoids R–16, R–29, R–34 and R–41, thereby setting the adding machine to print the figure "14.96." corresponding to the weight of the load represented by label 17.

Power is applied to the adding machine key solenoids only until condenser C–102 is discharged. When switch 76 reopens at the end of a scanner cycle, the signal from gate G–1116 to inverter V–1115 changes, and relay R–101 releases and thereby recloses its back contacts in the energizing circuit for relay R–105. The resulting shifting of the R–105 contacts in FIG. 4 disconnects the condenser C–102 from the adding machine key solenoids and connects the power circuit for recharging condenser C–102. Additionally the *r*–101 contacts which were completing the ground connection for the relays R–103 to R–118 will open and thereby release all of those relays which had been energized.

The same power which operates the adding machine key solenoids also energizes the Add Bar solenoid R-AB which starts the adding machine motor, and this action is utilized to provide an interlock for assuring proper operation of the adding machine before another weighing cycle can take place. The solenoid R-AB has front contacts *r*-AB which are connected to ground in parallel with the switch 80 (FIG. 6), and which are held closed throughout the adding machine cycle, including that portion of the cycle which remains after solenoid R-AB has been deenergized. The adding machine, however, normally has a substantially shorter cycle than that of the register-printer 20, partly because it does not sever and deliver an individual label as does the register-printer, and in the absence of malfunction, its cycle is completed before that of the register-printer.

As already noted, the interlock in the register-printer is released when switch 80 is opened as an incident to removal of the ejected label. If the adding machine cycle has been normal and is completed when the label is ejected, contacts *r*-AB will have reopened, and the opening of switch 80 will release the interlock in the usual way. If, however, the adding machine cycle has not been completed when the label is ejected, contacts *r*-AB will remain closed, and the interlock will remain in effect independently of the opening of switch 80 until the adding machine cycle is completed, after which switch 80 must again be opened and closed.

The interlock provided by contacts *r*-AB is equally effective if the adding machine fails to operate after the Add Bar solenoid is energized. In either case the blocking action of contacts *r*-AB serves as a signal of non-operation or incomplete operation of the adding machine, and it can readily be supplemented or replaced by a visual or audible signal such as a signal light connected in series with contacts *r*-AB similarly to the error light 60.

It will thus be seen that the invention provides simple, reliable and effective controls for receiving the desired information transmitted between the computer and register-printer and for supplying that information to an adding machine for sequential recording without interrupting or delaying operation of the balance of the system so long as all components function properly. At the same time, the invention provides simple interlock means for assuring that the adding machine does operate properly and for blocking operation of the balance of the system for another load until any malfunction of the adding machine has been corrected. Thus each time the scale system weighs and computes for a load, the weight and/or value information for that load is recorded in the adding machine, and a total can be taken whenever it is desired without affecting any other part of the system. It will be understood that the recording operation of the adding machine does not necessarily include printing information for each weighed load, and usually the adding machine will function conventionally to record each load cumulatively but to print only when a total is taken.

If a total is to be taken as noted above without regard to details such as the nature of the individual commodities to be weighed, no extra equipment is needed, and the regular controls of the adding machine will suffice. If, however, it is desired to obtain a total for each separate commodity weighed, additional controls are provided by the invention for assuring that such separate totals are taken, as now described in conjunction with FIG. 9.

The circuits shown in FIG. 9 modify those in FIG. 6 and are of special utility when it is desired to assure the taking of a total for the preceding series of weighing operations each time there is a change in the unit price or the commodity being weighed. Specifically, the circuits shown in FIG. 9 may be directly incorporated in the logic diagram of Case A, by breaking line L–49 in FIG. 13 of Case A and connecting it to ground through relay contacts *r*–102 and *r*–104, as shown in FIG. 9. The balance of the circuitry shown in FIG. 9 is connected through a second set of *r*–102 contacts to the point in FIG. 13 of Case A from which line L–49 was disconnected, i.e., in series with the normally closed switch 65. This switch 65 is opened and closed by each price change, and it is also opened whenever it is desired to change the commodity key which prints the commodity designation on label 17 as explained in detail in Patent 2,948,465 and as indicated diagrammatically in conjunction with the commodity key CK in FIG. 9, and it must be reclosed by a price change. The circuits of FIG. 9 do not affect normal operation of the system, which will be carried out for each load as already described, but they come into operation whenever the commodity key is changed as now described.

During normal sequential operation, relay R–102 is energized and locked in through its own contacts and switch 65 as shown. Whenever the unit price or the commodity key is changed, switch 65 is opened and then reclosed, and when it opens, relay R–102 unenergizes and thereby opens its contacts in the upper portion of FIG. 9 which were holding grounded the negative signal to flip-flop FF–54. If an attempt is made to operate the system under these conditions, the resulting negative signal on output *f54'* will result in an error signal from flip-flop FF–55 and will also prevent operation of the register-printer by making negative the *f54'* inputs to gates G–1014 and G–1017.

When the unit price knobs and commodity key have then been properly operated, switch 65 recloses, but relay R–102 remains open. At the same time, the "Take Total" signal light is lighted through back contact *r*–102 until the Total key of the adding machine has been operated and thereby temporarily closed its associated switch contacts S–12. Closing of these contacts completes the energizing circuit for relay R–102 and also for relay R–104, both of which lock in as shown.

The purpose of relay R–104 is to draw the attention of the operator to the necessity for setting the proper code into the adding machine for the next sequence of weighing operations, namely the preselected code which will identify the commodity represented by the next total, along with other desired information such as unit price. This setting of the code is effected by depressing appropriate keys on the adding machine keyboard, followed by operation of one or the other of the "Print-Non Add" keys having associated switch contacts K–1 and K–2 in the holding circuit for relay R–104. Until one of these keys has been operated to open its switch contacts and thus release relay R–104, its back contacts *r*–104 remain open in the circuit for grounding the negative input to flip-flop FF–54, and the system therefore cannot proceed. The "Set Code" signal light is illuminated as shown through front contacts *r*–102 and *r*–104 to call the attention of the operator to the necessity for setting the new code, and thereby releasing relay R–104, and it thus provides a visual signal in addition to the blocking action provided by the *r*–104 contacts.

The balance of the circuit shown in FIG. 9 corresponds essentially to FIG. 6 and is included for purposes of completeness to show how the interlock with the add bar solenoid R–AB is included with the other circuitry of FIG. 9. This interlock functions in the same way as already described to assure that the adding machine will complete its operation for each weighing operation, but its action is supplemented by the interlock provided by relay R–104 as described in the preceding paragraph.

FIG. 10 shows fragmentary circuits which are used in accordance with the invention when it is desired to prevent further operation after a predetermined number of loads have been weighed. FIG. 10 shows at the left the counter section of the circuit, which is powered from an A.C. source as shown and includes a counter coil R–10 connected for operation through back contacts of relay R–105. The counter mechanism also includes a clutch coil R–11 provided with a holding circuit through its own contacts *r*–11 and a pair of contacts CC which are opened by the counter mechanism upon completion of the preset number of operations. A reset switch S–12 is connected in parallel with this holding circuit, and an On-Off switch S–13 is also provided in the counter circuit to disable the countermechanism when desired.

In operation, the counter clutch is pre-set for the desired number of weighing cycles, and it is advanced one position during each cycle by counter coil R–10 when the latter energizes and deenergizes. When the preset number of cycles has been counted, contacts CC are opened and thereby cause clutch coil R–11 to release and to open its holding contacts *r*–11.

The right hand section of FIG. 10 shows the circuit arrangement for blocking further operation of the system after clutch coil R–11 releases as just described. Back contacts *r*–11 are connected in parallel with switch 80 and Add Bar solenoid contacts *r*–AB as already described, the contacts *r*–11 being connected to ground through an additional set of contacts of the On-Off switch S–13. Thus so long as the counter is in operation, the back contacts *r*–11 are open and have no effect on recycling. When the clutch coil R–11 releases, however, back contacts *r*–11 close and thus prevent release of the interlock through switch 80 until the counter has been reset. Normally the operator will take the total for the counted number of operations at the same time that the system is thus reset, and preferably such action is required by connecting reset switch S–12 to the Total key of the adding machine so that it is closed as an incident to the totaling operation.

FIG. 11 shows additional circuitry for use in conjunction with the counter of FIG. 10 for effecting operation of the system for a predetermined number of cycles and then requiring that a total be taken before further operation can begin. In addition, FIG. 11 illustrates the application of its circuitry to a system which includes a wrapping machine for automatically wrapping and conveying successive packages to the platter of the scale 10 in the general manner shown, for example, in Allen Patent 3,085,640. Thus the motor 99 in FIG. 11 represents the motor for such wrapping machine and conveyor and is shown diagrammatically as connected in a power circuit through a manual On-Off switch S–20.

At the start of a series of operations with the circuitry of FIG. 11, clutch coil R–11 is energized as explained in connection with FIG. 10, so that its back contacts *r*–11 are open in the energizing circuit for relay R–119. Each single cycle takes place as already described, and during each recording cycle of the adding machine, Add Bar contacts *r*-AB will close in the energizing circuit for relay R–120, thereby opening back contacts *r*–120 throughout the adding machine cycle. Then at the end of the preset number of operations, clutch coil R–11 will be deenergized, thereby closing its back contacts *r*–11 in the energizing circuit for relay R–119 and causing its back contacts *r*–119 to open.

The back contacts *r*–119 and *r*–120 in series with the conveyor motor 99 provide an interlock which blocks operation of the wrapping machine wherever the adding machine is in a recording cycle, and it also blocks operation of the adding machine after the preset number of operations has been completed until the total has been taken. As indicated in FIG. 11, the motor 99 drives a cam 100 controlling a switch S–99 connected in parallel with the relay contacts *r*–119 and *r*–120 The arrangement is such that the switch 99 is held closed throughout a major portion of a complete cycle of the conveyor, but then opens. If the components of the system have all operated within the normal interval, contacts *r*–119 and *r*–120 will be closed when this interval in the cycle occurs, so that motor 99 will remain energized. If, however, the adding machine cycle is not completed, or if a total has not been taken after the counter has released, the parallel circuit through contacts *r*–119 and *r*–120 will be open, and the motor will stop.

As noted, the interlock just described makes is essential that a total be taken for the preceding series of operations, since as described in connection with FIG. 9, it is the operation of the Total key of the adding machine which also closes the associated switch S–12 and thereby resets the counter by reenergizing clutch coil R–11. When the back contacts *r*–11 are thus opened, relay R–119 will release and thereby effect reclosing of its back contacts *r*–119 in the power circuit for motor 99. If desired, a signal may be connected in series with relay R–119 to act similarly to the "Take Total" signal light previously described in FIG. 9.

The On-Off switch S–15 connected with relay R–105 may be closed to disable both the adding machine and the counter without affecting operation of the balance of the system. This may be desirable, for example, in order to send a package through the weighing system without having it counted, as may be necessary if a new label is needed for a package which has already been weighed and counted, or if a weighed package requires rewrapping but should not be counted a second time.

FIG. 12 shows fragmentary circuitry which may be used in place of the circuitry of FIG. 10 for effecting operation of the system for a predetermined number of cycles and then automtically taking a total and resetting the counter. A portion of the circuitry in FIG. 12 is essenially the same as in FIG. 11 except that an additional pair of contacts is provided for resetting clutch coil R–11. These are the front contacts r–119 of a relay R–119 which is energized in response to energizing of the solenoid R–TL which operates the Total switch of the adding machine.

At the start of a series of cycles using the circuitry of FIG. 12, the clutch coil R–11 will ordinarily be energized by its reset switch S–12 and held in through its own front contacts r–11. The back contacts r–11 in the energizing circuit for relay R–104 will therefore be open, and relay R–119 will also be released. As shown in FIG. 7, relay R–101 will be released, and relay 105 will be energized. Each single cycle takes place as already described, and since relay R–102 will energize through the Add Bar solenoid switch r-AB during each cycle of the adding machine, counter coil R–10 will be successively energized and deenergized by way of front contacts r–102. Instead of the interlock shown in the other drawings in conjunction with contacts r-AB, the same effect is provided by front contacts r–102 in the circuit shown at the upper right hand corner of FIG. 12, since relay R–102 is energized throughout the cycle of the adding machine. The interlock connections in parallel with contacts r–102 remain open until the series of cycles is completed, since both of relays R–104 and R–119 are energized only upon completion of the series.

The operating circuits for solenoid R-TL are connected with and include some of the similar circuits for Add Bar solenoid R-AB shown in FIG. 4. When the preset total on the counter has been reached, clutch coil R–11 opens its holding contacts, and its back contacts will close in the energizing circuit for relay R–104. During the cycle of the adding machine for the last load of the series, relay R–102 will be energized through contacts r-AB, thereby opening its back contacts r–102 in the energizing circuit for solenoid R-TL. Since relay R–104 is energized during this interval, its back contacts in the charging circuit for condenser C–103 will open, and its front contacts will close in the energizing circuit for solenoid R-TL. Then when relay R–102 releases completion of the adding machine cycle, closing of its back contacts will complete the circuit for energizing solenoid R-TL and will therefore initiate the totaling cycle of the adding machine.

During the totaling cycle, contacts r-TL will close to energize relay R–119, and its front contacts r–119 in the lower right hand portion of FIG. 12 will close and automatically reset the counter by energizing clutch coil R–11. During the totaling cycle, however, the front contacts r–119 in the upper right hand corner of FIG. 12 will also be closed to provide an interlock preventing the system from starting the cycle for another load until the adding machine has completed its totaling cycle. When this occurs, relay R–119 will be released to remove the interlock.

During the totaling cycle of the adding machine, the contacts r-TL are held closed similarly to the action which holds contact r-AB closed during each registering cycle. Contact r–119 will therefore remain closed during this cycle, to provide the interlock which prevents another weighing and computing cycle. When the totaling cycle is completed, contacts r-TL open to release relay R–119, and when its contacts open, the system is ready to proceed with another series of operations, which will continue to the same preset total unless the setting of the counter is changed.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An automatic weighing, computing and recording system for handling a series of successive loads, comprising a plurality of decimal storage units for temporarily storing digital information concerning each weighed load, register means for individually recording said information for each such load and including a register member operatively connected with each of said storage units, scanner means for said storage units having a cycle of movement through a series of ten positions corresponding to the respective digits from "9" to "0," means for causing each of said storage units to emit a signal upon correspondence of the original setting thereof with one of said scanner positions, means responsive to emission of such signal by any one of said storage units for effecting setting of the associated said register member to the corresponding digit position, an adding machine for recording selected said information for a plurality of successive loads and having individually operated electrical inputs each corresponding to one of said storage units, and control means responsive to emission of said signal by any one of said storage units for effecting transmission of the corresponding digital information to the corresponding said adding machine input.

2. A system as defined in claim 1 wherein said control means comprises a plurality of counters each operatively connected with one of said storage units and the corresponding said adding machine input, means for driving said counters from said scanner means, and means for transmitting the signal emitted by each of said storage units to the associated said counter and thereby blocking further advance thereof.

3. A system as defined in claim 1 comprising means for generating a pulse in response to movement of said scanner means from each position thereof to the next, a plurality of pulse counters each operatively connected with one of said storage units and the corresponding said adding machine input, gate means for delivering each said pulse from said generating means to respective said counters to advance said counters correspondingly, and said gate means being responsive to delivery of the signal emitted by the associated said storage unit for terminating the advance of said counter.

4. A system defined in claim 1 wherein said storage units are decimal pulse counting units, and comprising pulse generating means for effecting transmission of a single pulse to each of said counting units in response to movement of said scanner means from each said position to the next in order to cause each of said counting units to advance through one cycle and the thereby to cause each said counting unit to emit a carry pulse consisting of the signal defined in claim 1 as it reaches its "0" position, a plurality of pulse counters each operatively connected with one of said storage counting units and the corresponding said adding machine input, gate means for delivering each of said pulses from said generating means to respective said counters to advance said counters correspondingly, and said gate means being responsive to delivery of the carry pulse emitted by the associated said storage counting unit for terminating the advance of said counter.

5. A system as defined in claim 1 comprising means for initiating the recording operating of said adding machine upon completion of said movement of said scanner means, and means producing a continuous signal of the operation of said adding machine so long as said recording operation thereof is not completed.

6. A system as defined in claim 1 comprising means for initiating the recording operation of said adding machine upon completion of said movement of said scanner means, and means blocking a subsequent operation of said system until said recording operation of said adding machine is completed.

7. A system as defined in claim 1 comprising means for initiating the recording operation of said adding machine upon completion of said movement of said scanner means, and means effective throughout said recording operation of said adding machine for blocking said system from transmission to said storage units of information concerning another load.

8. A system as defined in claim 1 wherein said register means includes means for printing and issuing a label containing said information for each weighed load, and comprising means for causing the recording operation of said adding machine contemporaneously with said printing operation of said register means, means providing an interlock blocking operation of said system for a second load until the issued ticket for the previous load has been removed, and means for preventing release of said interlock unless the recording operation of said adding machine has been completed.

9. A system as defined in claim 3 comprising decoding means operatively connected with each of said counters and operatively connected with the associated said adding machine input, means for selectively activating said decoding means in accordance with the digit position of the associated said counter, and means effective upon completion of said movement of said scanner means to maintain each of the activated said decoding means in activated condition independently of said counters.

10. A system as defined in claim 3 comprising a plurality of relays operatively connected with each of said counters and operatively connected with the associated said adding machine input, means for selectively energizing said relays in accordance with the digit position of the associated said counter, and means effective upon completion of said movement of said scanner means to establish a holding circuit for each of the energized said relays independently of said counters and then to reset said counters to their starting positions.

11. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operation of said adding machine in timed relation with the operation of said computer means, register means operatively connected with said computer means for printing and issuing a label containing information for each weighed load, means for causing the recording operation of said adding machine contemporaneously with said printing operation of said register means, means providing an interlock blocking operation of said system for a second load until the issued label for the previous load has been removed, and means preventing release of said interlock unless the recording operation of said adding machine has been completed.

12. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operation of said adding machine in timed relation with the operation of said computer means, register means operatively connected with said computer means for printing a record containing information for each weighed load, unit price designating means for printing a unit price designation on said record, commodity designating means for also printing on said record a commodity designation for each weighed load, and means responsive to change of one of said designating means for blocking said system from a further operation until the information for the preceding series of recording operations has been read out of said adding machine.

12. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operation of said adding machine in timed relation with the operation of said computer means, register means operatively connected with said computer means for printing a record containing information for each weighed load, unit price designating means for printing a unit price designation on said record, commodity designating means for also printing on said record a commodity designation for each weighed load, and means for maintaining the operation of said signal producing means until said adding machine has been set in accordance with said change of said designating means.

14. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operations of said adding machine in timed relation with the operation of said computer means, means presettable to a predetermined number for counting the successive recording operations of said adding machine, and means controlled by said counting means upon completion of the preset number of recording operations for producing a continuous signal requiring action by the operator to condition said system for further operation and thereby to effect discontinuance of said signal.

15. A system as defined in claim 14 wherein said signal producing means includes means blocking said system from a further operation until the information for the preceding series of recording operations has been read out of said adding machine.

16. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operation of said adding machine in timed relation with the operation of said computer means, means presettable to a predetermined number for counting the successive recording operations of said adding machine, means automatically responsive to completion of the preset number of recording operations to read out the information of all said recording operations, and means blocking a further operation of said system until completion of the operation of said automatically responsive means.

17. An automatic weighing, computing and recording system for handling a series of successive loads, comprising a scale, computer means operatively connected with said scale to read out the weight of each successive load and to compute the value thereof at a preset unit price, an adding machine for recording information for a plurality of successive loads, control means for transmitting selected information for each load from said computer means to said adding machine, means for initiating the recording operation of said adding machine in timed relation with the operation of said computer means, conveyor means for cyclically delivering successive loads to said scale and removing said loads from said scale following weighing thereof, and means blocking operation of said conveyor means until the operation of said adding machine is completed.

References Cited

UNITED STATES PATENTS

| | | | |
|---|---|---|---|
| 3,276,526 | 10/1966 | Loshbough | 177—4 X |
| 2,948,464 | 8/1960 | Allen | 235—58 |
| 3,055,585 | 9/1962 | Bell et al. | 235—61 |
| 3,170,624 | 2/1965 | Allen | 235—58 |
| 3,291,232 | 12/1966 | Bell | 177—3 |

GEORGE H. MILLER, Jr., *Assistant Examiner.*

RICHARD B. WILKINSON, *Primary Examiner.*